United States Patent
Chang

[11] Patent Number: 5,917,574
[45] Date of Patent: Jun. 29, 1999

[54] EYE PROTECTION ACCESSORY

[76] Inventor: B. Jin Chang, 5521 Overbrook Dr., Ann Arbor, Mich. 48105

[21] Appl. No.: 08/885,282

[22] Filed: Jun. 30, 1997

[51] Int. Cl.[6] .................................................. G02C 9/00
[52] U.S. Cl. ............................................. 351/47; 351/163
[58] Field of Search ............................. 351/44, 47, 57, 351/163, 45

[56] References Cited

U.S. PATENT DOCUMENTS

| | | | |
|---|---|---|---|
| 2,384,233 | 9/1945 | Bishop | 88/41 |
| 2,901,752 | 9/1959 | Granger | 351/47 |
| 4,676,609 | 6/1987 | Matsui | 351/118 |
| 4,796,986 | 1/1989 | Gowdy, Jr. | 351/57 |
| 5,007,727 | 4/1991 | Kahaney et al. | 351/47 |
| 5,056,906 | 10/1991 | Akiyoshi | 351/57 |
| 5,106,178 | 4/1992 | Akiyoshi | 351/57 |
| 5,123,724 | 6/1992 | Salk | 351/57 |
| 5,371,555 | 12/1994 | Nagel | 351/57 |
| 5,416,537 | 5/1995 | Sadler | 351/57 |
| 5,428,407 | 6/1995 | Sheffield | 351/58 |
| 5,493,348 | 2/1996 | Herald, Jr. et al. | 351/57 |
| 5,519,459 | 5/1996 | Moglianesi | 351/49 |
| 5,568,207 | 10/1996 | Chao | 351/57 |
| 5,708,490 | 1/1998 | Wieczorek | 351/47 |

Primary Examiner—Huy Mai
Attorney, Agent, or Firm—Gifford, Krass, Groh, Sprinkle, Anderson & Citkowski, PC

[57] ABSTRACT

A filter accessory is disclosed for use with a pair of eyeglasses. The accessory includes a filter lens of the type that substantially prevents the passage of light of a predetermined wavelength and means for mounting the filter lens inside the eyeglass lenses, wherein, in the preferred embodiment, engagement is made with nose pieces provided on the eyeglass frames.

4 Claims, 4 Drawing Sheets

EYE PROTECTION ACCESSORY

FIELD OF THE INVENTION

The subject invention relates generally to eye protection, and more specifically to optical filter accessories for use with eyeglasses to protect against harmful optical radiation such as laser light, ultraviolet sources, and so forth.

BACKGROUND OF THE INVENTION

Physicians, dentists and other health-care professionals and practitioners who use harmful light sources often require filters to protect their eyes during surgery or other procedures. Goggles and eyeglasses are available for this purpose, but the filters are permanently mounted in rigid frames. If the practitioner switches to an instrument that does not require filtering or that uses light with a different wavelength, they must change eyeglasses, and may need to have several different sets of glasses or goggles on hand at any given time.

Certain procedures may also require the practitioner to use vision aid devices such as magnification telescopic loupes or head-mounted lights. If such devices are mounted to eyeglass frames it may be impossible for the practitioner to use filter elements on top of the glasses. If the practitioner needs to switch filter types or work without a filter, the vision aid device must be removed and remounted to a different pair of glasses or the practitioner must have duplicates of the vision aid devices. Therefore, there is a need for a light filter accessory that will not interfere with vision aid devices.

SUMMARY OF THE INVENTION

The present invention is directed to a filter accessory for use with a pair of eyeglasses that substantially prevents the passage of light of a predetermined wavelength, thereby providing protection against harmful optical radiation in the form of laser light, ultraviolet sources, and so forth. In a preferred embodiment, the invention further includes means for mounting the accessory inside eyeglass lenses in the form of two clips located at the top of a filter frame which are configured to hang on the top edge of a corresponding eyeglass frame.

DETAILED DESCRIPTION OF THE PREFERRED EMBODIMENT

Figure 1:
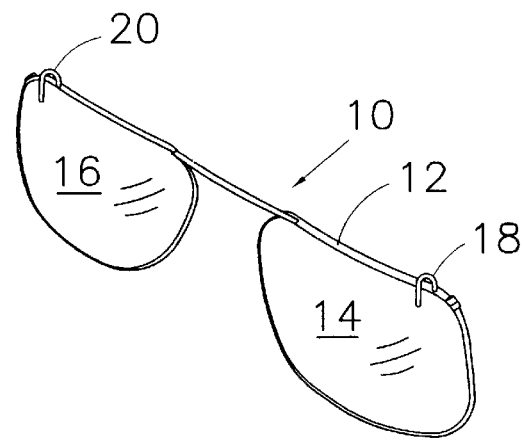
FIG. 1 is a perspective view of a filter accessory according to the present invention.

Referring to FIG. 1, a filter accessory according to the present invention is shown generally at 10. The accessory 10 preferably includes two filter lens elements 14 and 16 that are supported in a frame 12. The filter lens elements are of the type that substantially prevent the passage of light of a predetermined wavelength. As such, the filter accessory 10 may be used to block light produced by a laser instrument, ultraviolet source, or any other source of potentially harmful optical radiation, including multiple sources.

Figure 2:
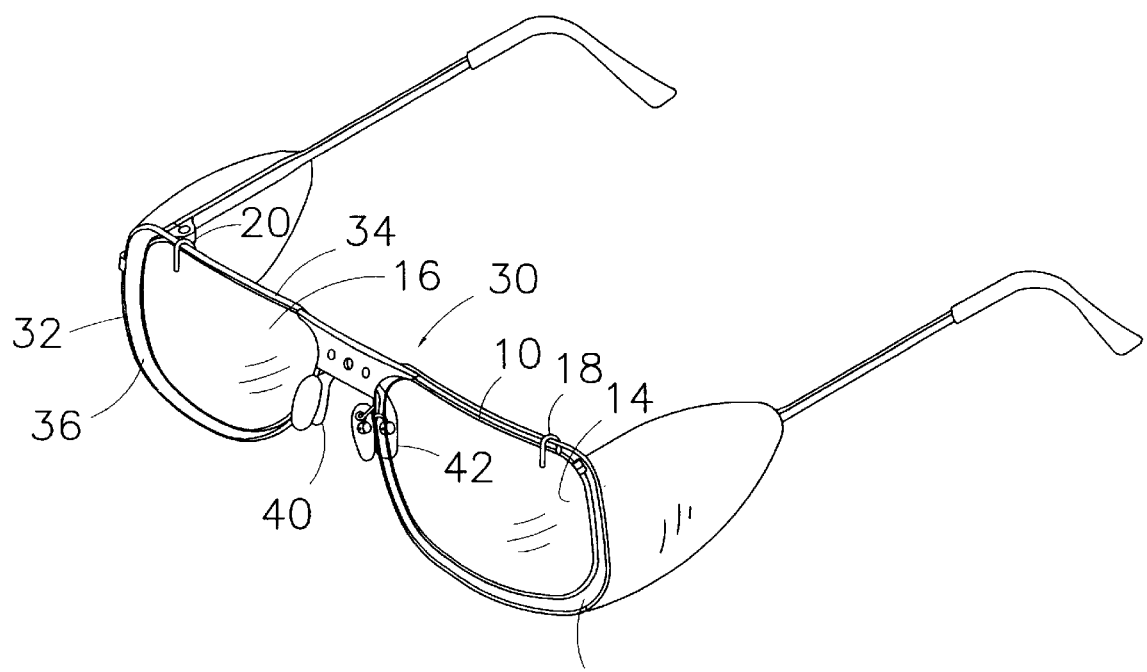
FIG. 2 is a perspective view of the filter accessory of FIG. 1 installed on a pair of eyeglasses.
Figure 5:
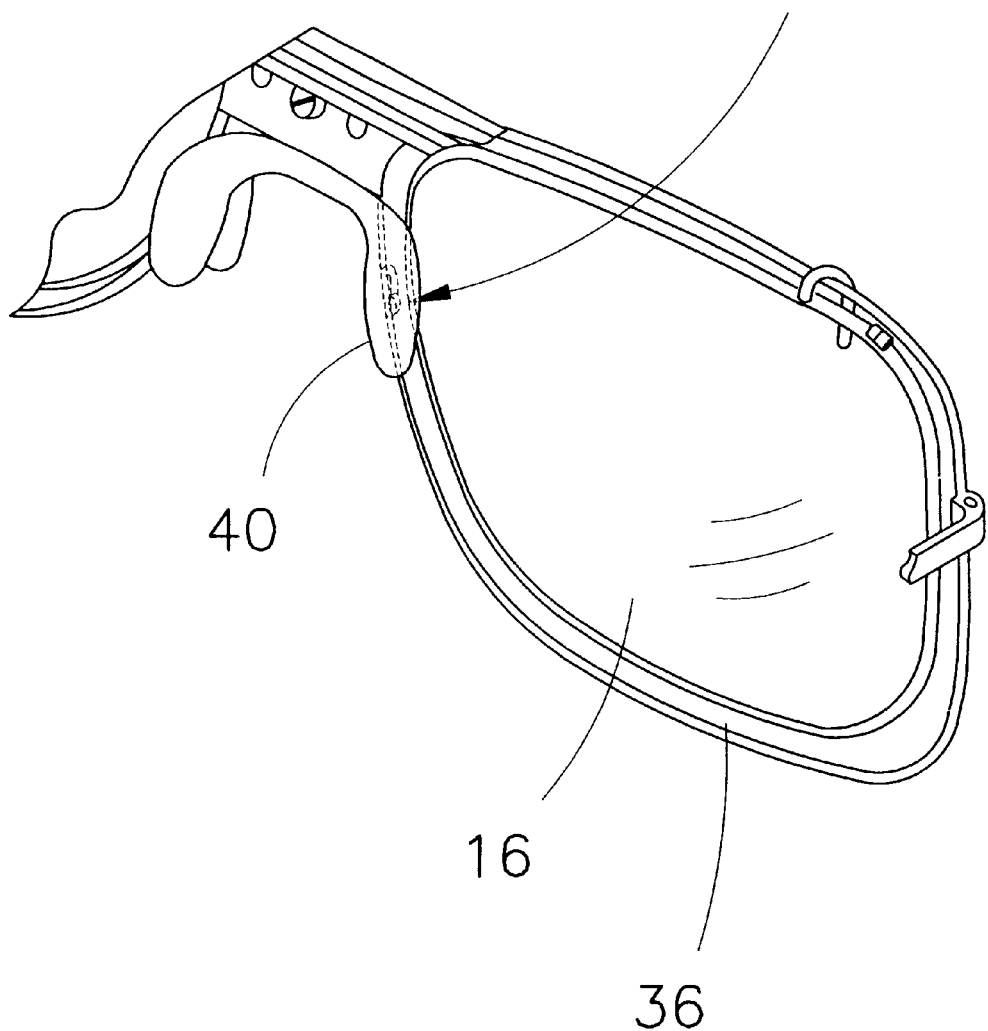
FIG. 5 is a close-up view of the way in which the bottom, inner edges of a filter accessory according to the invention engage with nose pieces on an eyeglass frame.

Referring now to FIG. 2, the accessory 10 is shown installed on a pair of eyeglasses 30. The eyeglasses 30 are preferably of the type having a frame 32 with a top edge 34, two lenses 36 and 38 supported in the frame 32, and two opposed nose pads 40 and 42. Referring to both FIG. 1 and FIG. 2, the filter frame 12 may include one or more clips 18 and 20 located at the top of the filter frame 12 and configured to hang on the top edge 34 of the eyeglasses 30. Note that the lower edges 22 and 24 of the accessory 10 are also preferably configured to engage with the nose pads 40 and 42, as best seen in FIG. 5. So installed, the filter elements are disposed in an inside region, which is defined as that space between the eyeglass frames 36 and 38 and the face of a wearer.

Figure 3:
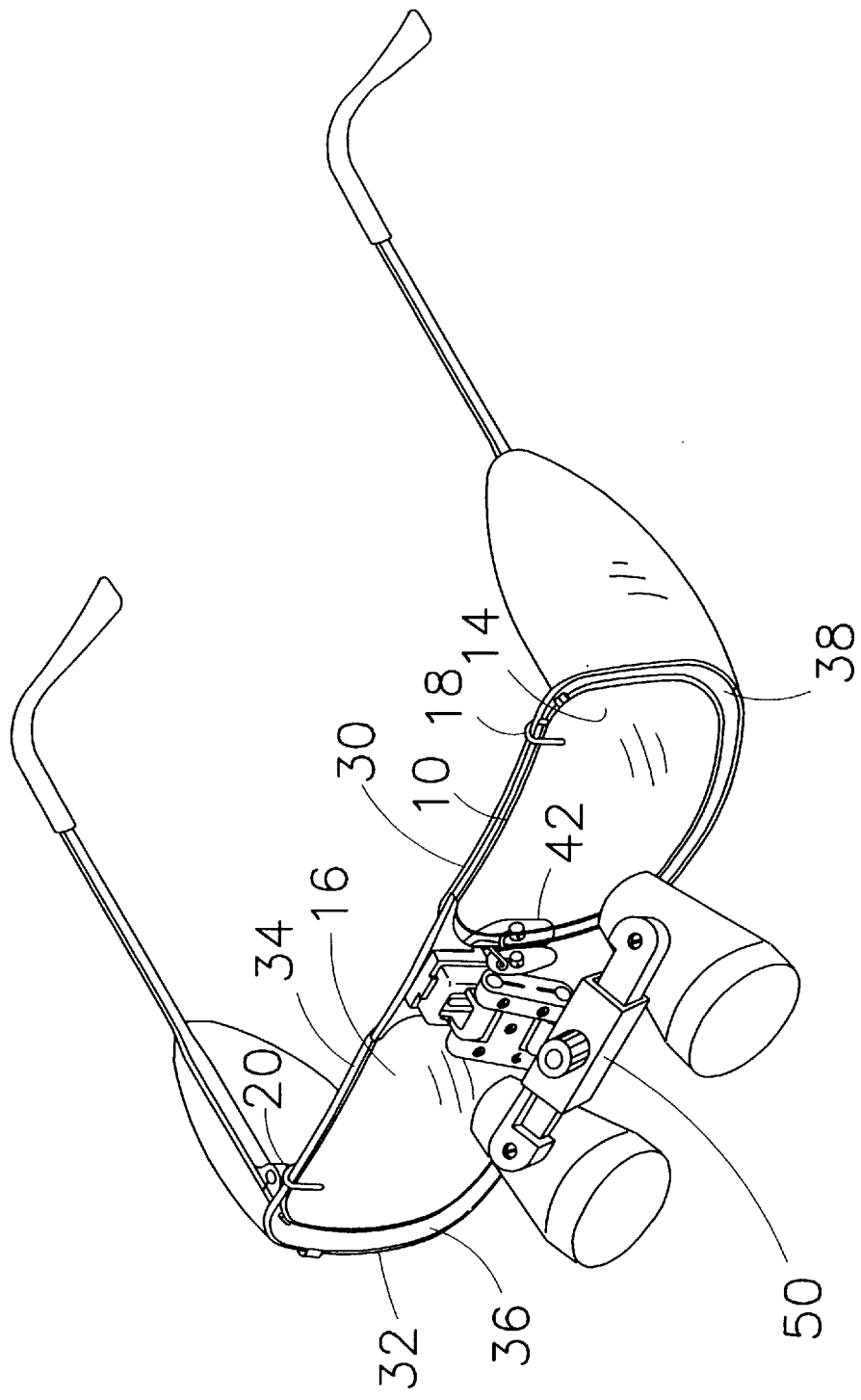
FIG. 3 is a perspective view of the filter accessory of FIG. 1 installed on a pair of eyeglasses including a vision aid device mounted thereto.

Referring now to FIG. 3, the accessory 10 is shown installed on a pair of eyeglasses 30 having a vision aid device 50 mounted on the eyeglasses 30. The vision aid device 50 shown includes a pair of oculars which provide magnification. Other vision aid devices such as lights, image sensors, etc. can also be mounted to the glasses 30. Note that because the filter accessory is located in the inside region, the vision aid device 50 may come very close to, or touch, the eyeglass lenses 36 and 38.

Figure 4:
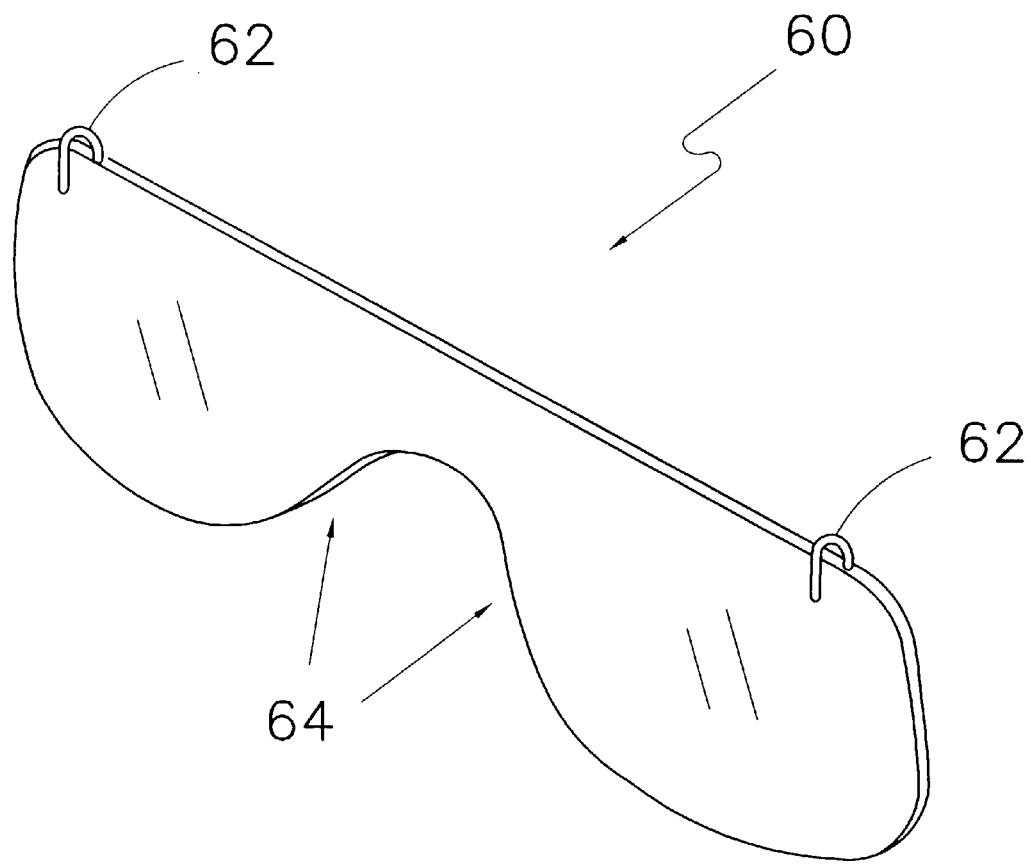
FIG. 4 is a perspective view of a first alternative embodiment of a filter accessory according to the invention.

Referring now to FIG. 4, the accessory 10 alternatively includes a one piece filter lens 60 rather than two elements 14 and 16. The filter frame 12 may thus be eliminated with clips 62 being connected directly to the filter lens 60.

As an alternative to the two clips such as 18 and 20 or 62 shown in the figures, alternative engagement mechanisms may be utilized including, for example, an accessory having an upper edge which curls forward to hang on the upper edge of the eyeglass frames.

I claim:

1. A filter accessory for use with a laser outputting a beam of light at a particular wavelength and pair of eyeglasses having a top edge, two lenses extending downwardly from the top edge, each lens having a back surface oriented toward a user's eyes defining an inside region between the user's eyes and the lenses, and a nose piece supported at least partially within the inside region, said nose piece including an outer surface adapted to engage with the side of a user's nose and an inner surface spaced apart from the back surface of each lens, said filter accessory comprising:

an optical filter that substantially prevents the passage of light at the laser wavelength; and means to mount said filter within said inside region such that a portion of each filter makes at least partial use of the nose piece for said mounting by being captured within space between the inner surface of the nose piece and the back surface of said lens.

2. The filter accessory of claim 1, said filter further including:

one or more clips for hanging on said top edge of the eyeglasses; and a lower edge configured to engage with said nose piece.

3. The filter accessory of claim 1, wherein:

the filter comprises two elements, such that one element is positioned adjacent each of said eyeglass lenses.

4. A filter accessory for use with a pair of eyeglasses having a frame with a top edge, two lenses supported within the frame, each lens having a back surface defining an inside region between a user's eyes and the eyeglass lenses, and a nose piece assembly, the nose piece assembly including two opposing nose pads supported at least partially within the inside region, the filter accessory comprising:

two filter elements, each of which substantially prevents the passage of light of a predetermined wavelength; and means for supporting said filter elements within said inside region, including a plurality of clips for hanging said filter elements on said top edge of the eyeglasses, each of said nose pads including an outer surface adapted to engage with the side of a user's nose and an inner surface spaced apart from the back surface of each lens, each of said filter elements including a side edge which is captured within the space between the inner surface of each nose pad and the back surface of each respective lens.

\* \* \* \* \*